C. M. NES.
Files.

No. 133,793.  Patented Dec. 10, 1872.

Witnesses
C. B. Nottingham
Thomas E. Smith

Inventor.
Charles Mosier Nes
by atty A. Pollok

UNITED STATES PATENT OFFICE.

CHARLES MOTIER NES, OF YORK, PENNSYLVANIA.

IMPROVEMENT IN FILES.

Specification forming part of Letters Patent No. 133,793, dated December 10, 1872.

*To all whom it may concern:*

Be it known that I, CHARLES M. NES, of York, in the county of York and State of Pennsylvania, have invented certain new and useful Improvements in Files, of which the following is a specification:

The file, in which my invention consists, is a circular or wheel-like file adapted to be mounted on a mandrel or shaft and revolved by suitable power. Both on the score of economy and of ease of manufacture, and for other reasons I make the file proper of annular shape like the tire of a wheel, and then I mount this tire-like file upon a suitable disk or wheel of wood or metal, upon which the file is then tightened by shrinkage, as in the case of an ordinary wagon-tire, and is tempered and hardened by and during the operation of shrinking, as hereinafter described.

Figure 1:
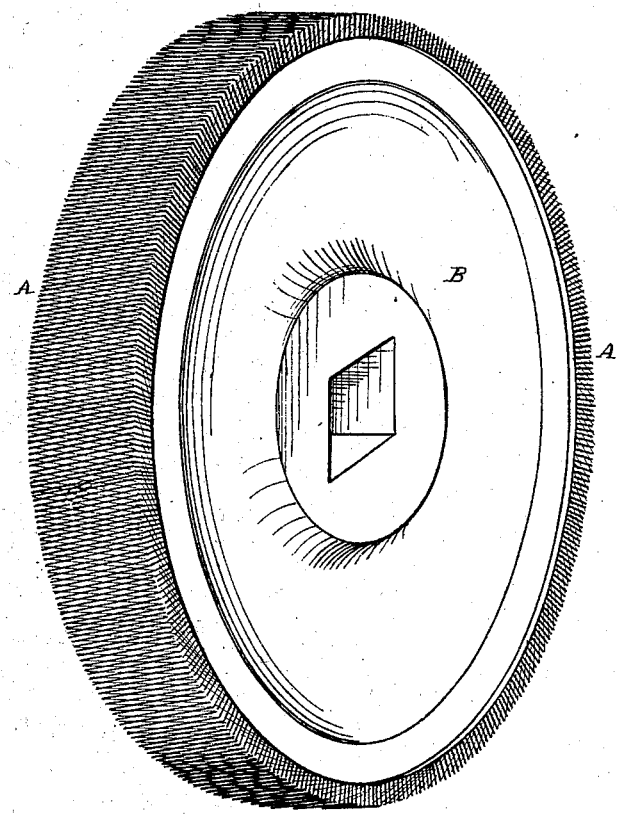
Figure 2:
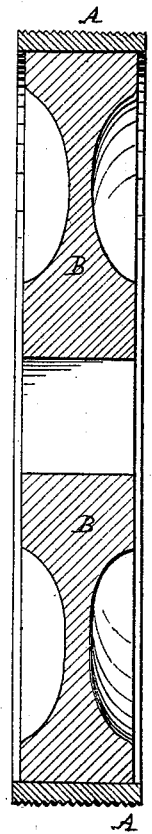

A file of this construction is shown in the drawing, in which Figure 1 is a perspective view of the file, and Fig. 2 is a section in the plane of the axis of the same.

In making the file I proceed as follows: I take bar-steel of suitable section, length, breadth, and thickness, and after bending it so that the two ends will meet I weld the ends together. I then file-cut the periphery, or the periphery and sides, of the steel rim thus produced in the same manner as in cutting an ordinary file. As a support for the file I provide a disk or wheel of wood or metal of the proper diameter and thickness. I now heat the file-cut steel rim to a tempering heat, so as to expand it sufficiently to fit (when hot) the disk or wheel, and when thus heated I apply it to and fit it upon said disk or wheel. When this is effected I pour cold water over the rim or plunge it into water; this causes the rim to contract, and binds and fastens it upon the disk or wheel, and also hardens and tempers the file.

It may be found desirable, in some instances, to provide additional means for holding the file-rim in place, but ordinarily the above will answer the purpose.

In the drawing, A represents the file-cut rim from "silicon steel," for which Letters Patent of the United States heretofore have issued to me, owing to its capability of being worked at a high degree of heat, its malleability, and its extreme hardness when tempered; these properties rendering it peculiarly adapted for the manufacture of files such as described; but I do not limit myself to the use of this steel, as I may employ any other steel suitable for the purpose.

A file of this kind can be used to great advantage for dressing or finishing articles. Car-axles, for instance, can be thus readily dressed and finished. The file should revolve in one direction, while the article to be dressed, being placed in a lathe, should be caused to revolve in the opposite direction. In this way the surface of the article to be dressed or finished can be removed evenly and smoothly.

The face of the file may be made flat, convex, concave, or any other shape required.

Having now described my invention, what I claim, and desire to secure by Letters Patent, is—

The manufacture of circular files, composed of an annular file-cut steel rim and a supporting block or disk, substantially as herein described—that is to say, by heating said rim to a tempering heat, then fitting it on its supporting-disk, and then shrinking it thereon—substantially as set forth, whereby said rim by and during the operation of shrinking is also tempered and hardened.

In testimony whereof I have signed my name to this specification before two subscribing witnesses.

CHAS. MOTIER NES.

Witnesses:
JOHN A. WILSON,
JAMES YEATS.